UNITED STATES PATENT OFFICE.

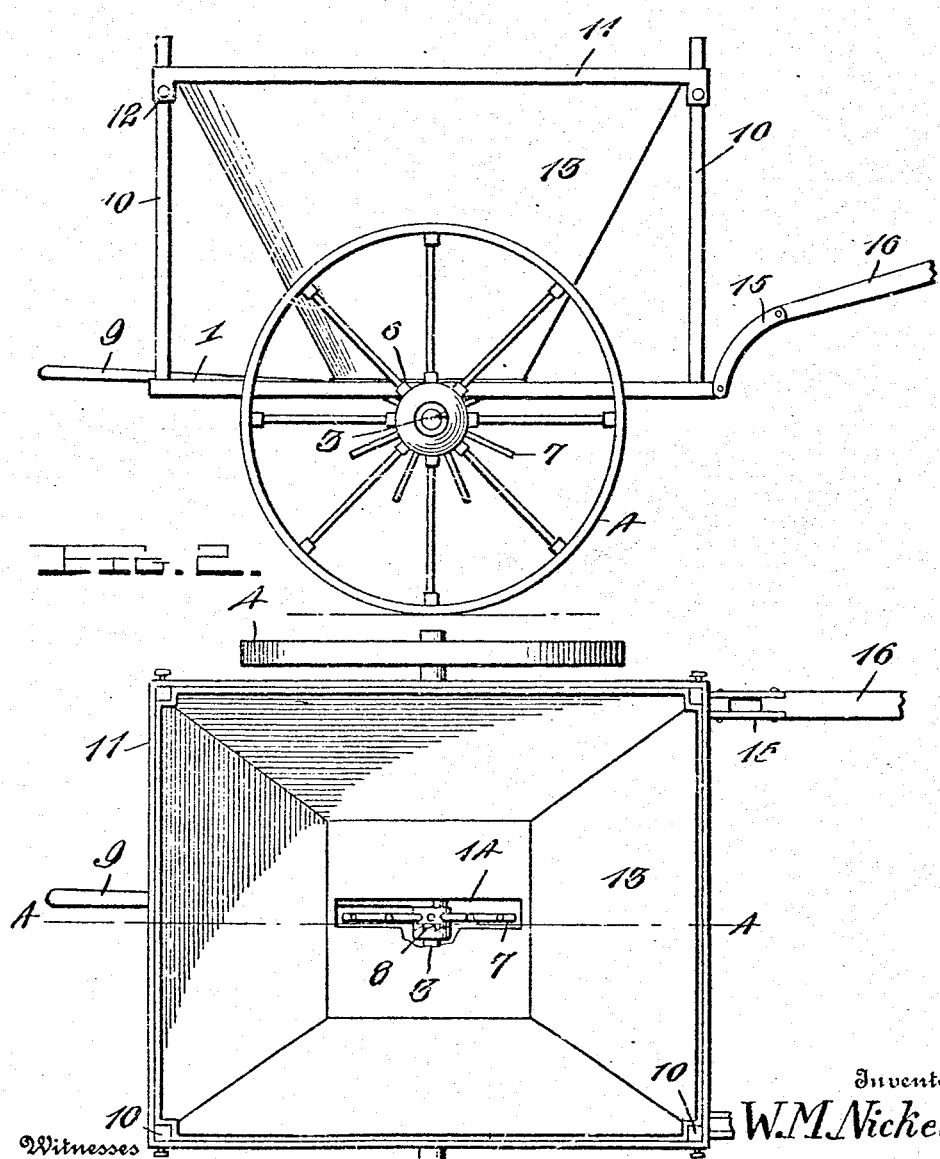

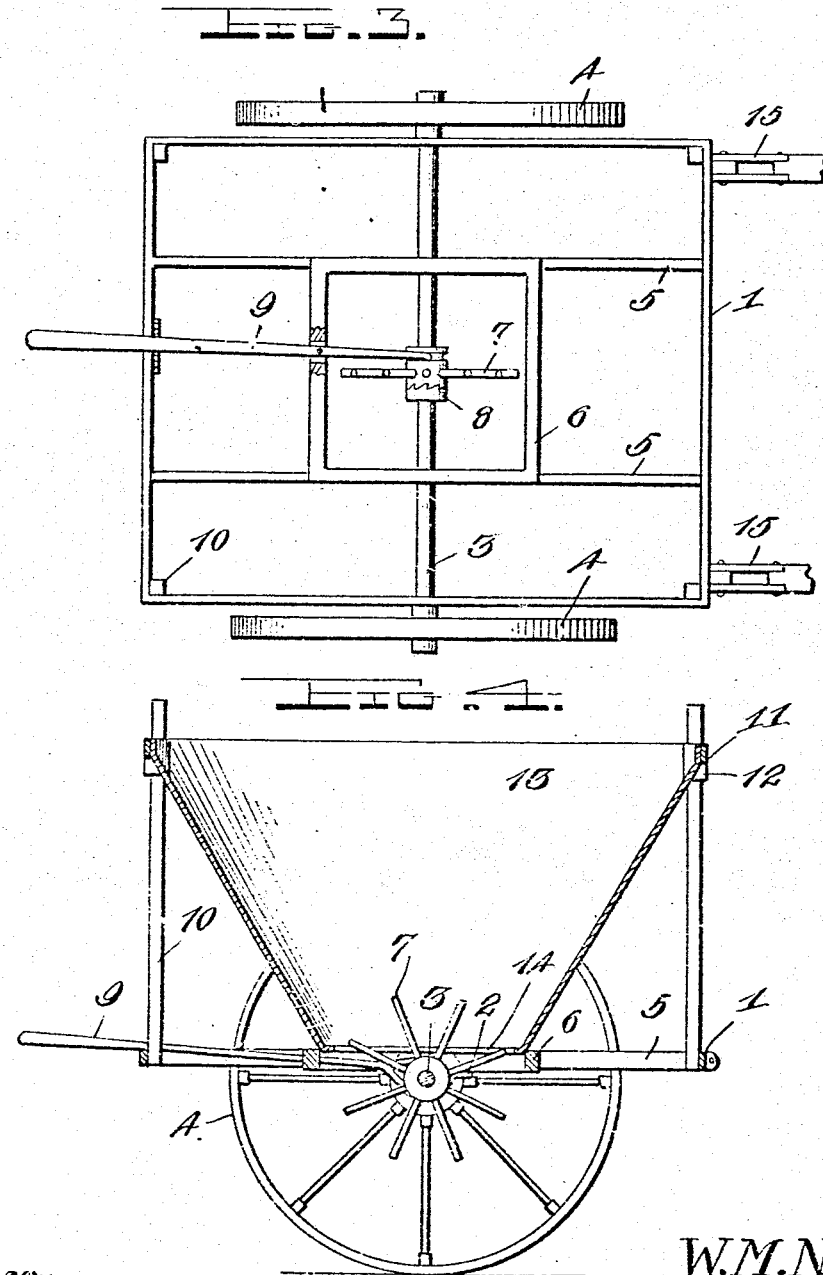

WILLIAM M. NICKELL, OF SUMMERS, ARKANSAS.

FERTILIZER-DISTRIBUTER.

1,009,684.

Specification of Letters Patent. Patented Nov. 21, 1911.

Application filed July 19, 1911. Serial No. 639,442.

*To all whom it may concern:*

Be it known that I, WILLIAM M. NICKELL, a citizen of the United States, residing at Summers, in the county of Washington and State of Arkansas, have invented certain new and useful Improvements in Fertilizer-Distributers, of which the following is a specification, reference being had to the accompanying drawings.

My invention relates to new and useful improvements in fertilizer distributers and more particularly to a manure spreader, and my object is to provide a device of this character which is adapted to feed manure in a furrow where seed has been planted for raising crops in rows.

A further object of the invention resides in the provision of a device wherein various sized hoppers may be used.

A further object of the invention resides in the provision of an adjustable frame supported above the main frame of the device, which is adapted to be raised or lowered to accommodate various sized hoppers.

A still further object of the invention resides in providing a device which is extremely simple in construction, thereby readily and cheaply manufactured, and one which is very effective and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device. Fig. 2 is a top plan view thereof. Fig. 3 is a similar view with the hopper removed, and, Fig. 4 is a vertical section as seen on line 4—4, Fig. 2.

In carrying out my invention, I shall refer to the drawings in which similar reference characters designate corresponding parts throughout the several views and in which 1 indicates a frame of rectangular design upon which is rotatably mounted in the bearings 2, an axle 3, the ends of which project beyond the sides of said frame and have mounted thereon, the driving and supporting wheels 4. Also mounted within said frame 1 about centrally thereof by means of the brace or supporting rods 5, is an additional rectangular frame 6, which frame is disposed immediately above the axle 3, and loosely carried on said axle 3 within the inner frame 6, is a forked feed wheel 7. This wheel, as stated, is loosely mounted on the axle and a clutch mechanism 8 is also provided in connection therewith, said wheel being provided on one side thereof with a clutch face, and when it is desired to allow the wheel to rotate with the rotation of the axle 3, said wheel may be forced into engagement with the clutch mechanism by means of a lever 9 which is fulcrumed on said main frame 1.

Secured in the four corners of the main frame 1 and extending vertically therefrom, are the supporting or guide rods 10, and slidably mounted thereon, is an additional rectangular frame 11. This latter frame is adjustably mounted on said guide rods 10, and in order to retain the same in any adjusted position, the clamping rings or sleeves 12 are provided, whereby it will be seen that the frame 11 may be raised or lowered to any desired position with respect to the lower or main frame 1. A hopper 13 of substantially frusto-pyramidal design is provided and supported in said frames so that the smaller end thereof rests within the small inner frame 6, while the outwardly flared sides thereof rest against the upper frame 11, and the bottom or smaller end of said hopper is provided with a slot 14, through which extend the teeth or prongs of the feed wheel 7. This hopper may be of any desired size, whatsoever, and in order to compensate for the various sizes, the frame 11 is adjustably supported on the guide rods 10 so that when hoppers of large sizes are used, the same will be raised on said guide rods, while when smaller hoppers are used, said frame is lowered. From the forward portion of the frame 1, extend the upwardly curved arms 15, with which are adapted to be engaged the ends of the shafts 16, whereby drafts may be provided for the propulsion of the device.

In operation, the hopper is filled with manure, and with the feed wheel 7 disposed in its inoperative position, the device is driven to the field where the manure is adapted to be spread. The device is then brought in position so that the feed wheel is immediately over the furrow in which the manure is adapted to be fed, whereupon said wheel is moved to its effective position and the device driven forwardly. The rotation of the axle upon which the drive wheels are mounted, will cause the feed wheel 7 to be rotated, thereby distributing the manure within the hopper into the furrow in which the seed has been planted. In this manner, the seed which has been planted in rows, may have the soil in which the same is planted, enriched before being covered, whereby the crops will be greatly aided both in the time required for the growth and quality thereof.

From the foregoing, it will be seen that I have provided a manure spreader of improved design wherein the manure may be fed to the furrow in which seed has been planted in rows. It will further be seen that I have provided means for the provision of various sized hoppers, which means may be readily and quickly adjusted. It will still further be seen that my device is of such simple construction as to be readily and cheaply manufactured, and one which is very effective and useful in operation.

What I claim is:—

1. In a device of the character described, the combination with a main frame, an axle rotatably mounted thereon, and supporting wheels carried on the ends of said axle; of an additional frame mounted above said main frame, means to secure the same in adjusted positions with respect to said main frame, a hopper having the upper portion thereof resting on the additional frame and having the lower end thereof disposed between the sides of said main frame, said hopper having the bottom thereof provided with a slot, and a feed wheel on said axle projecting through the slot in said hopper.

2. In a device of the character described, the combination with a main frame, an axle rotatably mounted thereon, and supporting wheels carried on the ends of said axle; of an inner frame supported within said main frame, an auxiliary frame adjustably supported above said main frame, a hopper of frusto-pyramidal design having the lower portion thereof disposed within said inner frame and having the upper portion thereof resting upon said auxiliary frame, said hopper being provided with a slot in the bottom thereof, and a feed wheel carried on said axle and projecting through the slot in said hopper.

3. In a device of the class described, the combination with a main frame, an axle rotatably mounted thereon, and supporting wheels carried on the ends of said axle; of an inner frame supported within said main frame, vertical guide bars carried by said main frame, an auxiliary frame slidably mounted on said guide bars, means to retain said auxiliary frame in any adjusted position thereon, a hopper of frusto-pyramidal design having the lower portion thereof disposed within said inner frame and having the upper portion thereof resting upon said auxiliary frame, said hopper being provided with a slot in the bottom thereof, and a feed wheel carried on said axle and projecting through the slot in said hopper.

In testimony whereof I hereunto affix my signature in the presence of two witnesses.

WILLIAM M. NICKELL.

Witnesses:
 JOHN M. MARTIN,
 THOMAS L. JACKSON.